United States Patent
Braunheim et al.

(10) Patent No.: US 11,020,693 B2
(45) Date of Patent: Jun. 1, 2021

(54) FUEL FILTER FOR CLEANING FUEL FOR AN INTERNAL COMBUSTION ENGINE

(71) Applicant: Mahle International GmbH, Stuttgart (DE)

(72) Inventors: Michael Braunheim, Goeppingen (DE); Matthias Gaenswein, Esslingen (DE); Uli Haeussermann, Fellbach (DE); Stephan Schild, Leingarten (DE); Dietmar Wilhelm, Wiernsheim (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/420,139

(22) Filed: May 22, 2019

(65) Prior Publication Data

US 2019/0358565 A1 Nov. 28, 2019

(30) Foreign Application Priority Data

May 23, 2018 (DE) .................... 10 2018 208 082.8

(51) Int. Cl.
*B01D 29/94* (2006.01)
*F02M 37/44* (2019.01)
(Continued)

(52) U.S. Cl.
CPC ....... *B01D 29/945* (2013.01); *B01D 29/0013* (2013.01); *B01D 36/003* (2013.01); *F02M 37/44* (2019.01); *F02M 37/025* (2013.01)

(58) Field of Classification Search
CPC .. B01D 36/003; B01D 36/005; B01D 36/006; B01D 36/008; B01D 2201/208; F02M 37/24; F02M 37/26
See application file for complete search history.

(56) References Cited

U.S. PATENT DOCUMENTS

| 6,444,121 B1 | 9/2002 | Maxwell | |
|---|---|---|---|
| 8,673,138 B2 * | 3/2014 | Braunheim | .......... B01D 36/005 210/114 |
| 2006/0086649 A1 * | 4/2006 | Wieczorek | .......... B01D 36/003 210/120 |

FOREIGN PATENT DOCUMENTS

| DE | 3740804 C1 | 7/1989 |
|---|---|---|
| DE | 69909520 T2 | 4/2004 |

(Continued)

OTHER PUBLICATIONS

English Abstract for DE3740804 C1.
(Continued)

*Primary Examiner* — Benjamin M Kurtz
(74) *Attorney, Agent, or Firm* — Fishman Stewart PLLC

(57) ABSTRACT

A fuel filter for cleaning fuel for an internal combustion engine may include a main filter and a prefilter arranged upstream of the main filter, through which a fuel is successively flowable. The prefilter may include a water separator configured to separate water present in the fuel. The water separator may include a water collection chamber structured and arranged to collect the separated water. The prefilter fluidically connected to the main filter via a conveying device structured and arranged to convey the fuel from the prefilter into the main filter. The conveying device may be configured to provide an excess pressure build up. The fuel filter may also include a suction jet pump fluidically connected to the water collection chamber via which at least one of the fuel and the water is dischargeable from the water collection chamber.

15 Claims, 2 Drawing Sheets

(51) Int. Cl.
    *B01D 29/00*          (2006.01)
    *B01D 36/00*          (2006.01)
    *F02M 37/02*          (2006.01)
    *B01D 29/56*          (2006.01)
    *F02M 37/04*          (2006.01)
    *F02M 37/54*          (2019.01)
    *F02M 37/00*          (2006.01)
    *F02M 37/26*          (2019.01)
    *F02M 37/32*          (2019.01)
    *F02M 37/24*          (2019.01)

(56)          References Cited

FOREIGN PATENT DOCUMENTS

| EP | 1 851 425 A1 | 11/2007 |
| EP | 1 653 075 B1 | 9/2010 |
| EP | 1851425 B1 | 4/2016 |
| EP | 3287631 | 2/2018 |

OTHER PUBLICATIONS

German Search Report dated Mar. 29, 2019 for copending German Patent Appl. No. DE 10 2018 208 082.8.
European Search Report dated Oct. 15, 2019 for copending European Patent Appl. No. EP 19 17 5381.

* cited by examiner

FUEL FILTER FOR CLEANING FUEL FOR AN INTERNAL COMBUSTION ENGINE

TECHNICAL FIELD

The invention relates to a fuel filter for cleaning fuel for an internal combustion engine. The invention further relates to an internal combustion engine having such a fuel filter and a motor vehicle having such an internal combustion engine.

BACKGROUND

Complex fuel filters, in particular for diesel fuel, are often constructed in two stages and comprise a prefilter and a main filter having a conveying device which is connected therebetween, typically in the form of a suitable fuel pump. The fuel filter generally comprises in this instance a water separator for separating the water contained in the fuel and—as part of the water separator—a water collection chamber for collecting the separated water.

In this instance, the water collection chamber with specific filter systems may have a return line back into the fuel tank. An advantageous use for the return line from the water collection chamber to the tank is, for example, also a filling level limitation for water in the water collection chamber. So that a flow can be brought about, a pressure drop with respect to the return line must exist. With fuel filters which are operated at the intake side, the pressure drop in the direction of the return line in the filter first has to be produced.

SUMMARY

An object of the present intention is to provide new methods for the development of fuel filters for internal combustion engines, in particular for diesel engines.

This object is achieved by the subject-matter of the independent patent claim(s). Preferred embodiments are set out in the dependent patent claim(s).

The basic notion of the invention is accordingly to provide a fuel filter with a suction jet pump which is connected in fluid terms to the water collection chamber of the water separator so that by means of the suction jet pump water and fuel can be discharged from the water collection chamber, in which a reduced pressure is active, into the return line, in which a higher pressure than in the water collection chamber is active. In the suction jet pump, the pump action required for this is provided using a propellant from the pressure-side main filter which by means of impulse exchange draws and consequently conveys the water or fuel from the water collection chamber. Using the suction jet pump, it is therefore possible in a simple manner to produce the pressure drop required for the transport of water or fuel from the water collection chamber without an external drive having to be provided to drive the pump for this purpose from outside.

A fuel filter according to the invention for cleaning fuel for an internal combustion engine comprises a main filter and a prefilter which is arranged upstream of the main filter. The fuel can consequently flow successively through the prefilter and the main filter. The prefilter comprises a water separator for separating water present in the fuel. To this end, the water separator has a filter element, in particular in the form of a hydrophobic membrane, for separating the water from the fuel and a water collection chamber for collecting the separated water. The prefilter is connected in fluid terms to the main filter by means of a conveying device which conveys the fuel from the prefilter into the main filter.

The fuel which is drawn from the prefilter flows from a suitable fuel reservoir into the prefilter. After flowing through the main filter, the cleaned fuel is available for use in the internal combustion engine.

According to the invention the fuel filter comprises a suction jet pump which is connected in fluid terms to the water separator, preferably to the water collection chamber thereof, in order to discharge the water which has been separated by means of the water separator or which has accumulated in the water collection chamber, in particular when the water exceeds a predetermined maximum filling level.

During operation of the fuel filter, that is to say, during operation of the conveying device with pressure build-up in the main filter, a small partial quantity continuously flows out of the pressure region of the main filter via the suction jet pump into the return line and continuously conveys water or fuel from the water collection chamber in the reduced pressure region of the prefilter into the return line.

The water collection chamber of the prefilter is normally filled with fuel and ventilated. If the fuel conveyed out of the fuel reservoir contains portions of water, this is retained in the water separator, flows at that location into the water collection chamber and at that location displaces the fuel present therein. The water accumulates as a result of the higher density of the water to the fuel at the base of the water collection chamber and gradually fills the water collection chamber. If the water collection chamber is filled, the water should be discharged by way of a water discharge means. In a preferred embodiment, therefore, it is proposed to provide in a lower region of the water collection chamber a water outlet from which water can be discharged out of the water collection chamber. Alternatively or additionally, an outlet which is connected in fluid terms to the suction jet pump can be constructed as an overflow which determines a maximum possible filling level of water in the water collection chamber.

If no water were to be drained or discharged from the water collection chamber, the water collection chamber would overflow with additionally supplied water, that is to say, the water which is additionally supplied would not be retained and would be able to reach the engine together with the fuel. For this reason, the maximum filling level for water in the water collection chamber has to be limited.

Another reason for the determination of a maximum permissible filling level for water in the water collection chamber is the practical risk of the water freezing to form ice with an increase in volume. When the water freezes to form ice, there must be present in the water collection chamber a volume proportion which is filled with fuel and which can be filled by the increased volume of the ice, wherein the fuel has to be able to be displaced via the supply and discharge channels of the water collection chamber into other regions of the fuel filter. When the container is completely filled with water, it may burst when the water freezes.

Since, in practice, it is not always possible to discharge water from the water separator, the maximum filling level for water in the water collection chamber in a preferred embodiment is limited by the connection line between the water collection chamber—suction jet pump—return line being discharged in fluid terms at a defined level in the water collection chamber and this connection thus forms an "overflow" for water. Below the outlet into the connection line, the water accumulates as a result of the density difference with respect to the fuel on the housing base. If water continues to be supplied and if the filling level reaches the level of the outlet in the connection line, additional water is then transported with the continuous volume flow through the connection line from the water collection chamber via the suction jet pump into the return line. The level of the outlet into the connection line in the water collection chamber is selected in such a manner that, at this level and under normal operating conditions, no water can reach the internal combustion engine together with the fuel and the filter housing does not burst when the collected water freezes.

If water is transported from the water collection chamber via the suction jet pump into the return line, it returns to the tank via the return line. The tank consequently acts for a transitional period as a buffer for the returned water.

According to a preferred embodiment, there is provided on the main filter a fuel outlet which communicates in fluid terms with the suction jet pump. In this manner, the fuel which flows through the fuel outlet can be used as a propellant for the suction jet pump so that the complexity for driving the pump remains negligible. If the fuel outlet channel from the main filter to the suction jet pump is used at the same time as a ventilation channel for the fuel filter, the additional economic expenditure is also low.

According to another preferred embodiment, the fuel outlet communicates via the suction jet pump in fluid terms with an additional water separator. This additional water separator serves to separate the fuel which acts as a propellant from the water which is conveyed by the suction jet pump out of the water separator or the water collection chamber thereof.

Alternatively, it may be advantageous to direct the volume flow from the connection line between the water collection chamber—suction jet pump—return line via an additional water separator into the tank and to provide a water discharge means in this additional water separator. This additional water separator may advantageously be arranged in a manner spatially separated from the actual fuel filter, that is to say, preferably as a component in or on the tank. The volume of the water collection chamber could in this construction variant accordingly be constructed to be small and in the water collection chamber a water discharge means could be dispensed with.

According to an advantageous development, a water separator fuel outlet is arranged in the additional water separator. This outlet communicates in fluid terms in order to discharge the fuel present in the additional water separator with a fuel reservoir. In this manner, the water which has been separated can be effectively freed from fuel residues, wherein the separated fuel is available for use in the internal combustion engine.

According to an advantageous development, the main filter may have a filter housing in which a filter element is arranged. The filter element subdivides the housing inner space which is delimited by the filter housing into a dirty side and a clean side. The said fuel outlet to the suction jet pump is carried out in this instance at the dirty side or the clean side, wherein with a fuel outlet on the dirty side in the upper region of the filter housing the ventilation of the filter device can be carried out in the same channel. At the clean side of the filter, a fuel outlet for discharging the cleaned fuel from the fuel filter into an internal combustion engine is provided. Consequently, the filtered fuel in the internal combustion engine can be used. The quantity of fuel discharged by the suction jet pump substantially corresponds to the quantity of fuel which is returned permanently to the tank to independently ventilate the filter and therefore does not constitute a disadvantage.

According to another advantageous development, the water separator has a separator housing which delimits a housing inner space through which the fuel can flow. In this development, a hydrophobic membrane through which the fuel can flow in order to separate the water present in the fuel is arranged in the housing inner space. Using such a hydrophobic membrane, high separation rates can be achieved with a small structural spatial requirement.

In a particularly preferred manner, the water collection chamber is formed by a lower region of the housing inner space with respect to the direction of gravitational force.

The invention further relates to an internal combustion engine for a motor vehicle having cylinders in which a combustion chamber is provided in each case. Each cylinder has at least one fuel injector for injecting fuel into the respective combustion chamber. The internal combustion engine comprises a fuel supply for introducing the fuel into the fuel injectors. According to the invention, a fuel filter set out above is arranged upstream of the fuel supply. The above-explained advantages of the fuel filter are therefore also applicable to the internal combustion engine according to the invention.

Other important features and advantages of the invention will be appreciated from the dependent claims, from the drawings and from the associated description of the Figures with reference to the drawings.

Of course, the features mentioned above and those explained below can be used not only in the combination set out but also in other combinations or alone without departing from the scope of the present invention.

Preferred embodiments of the invention are illustrated in the drawings and are explained in greater detail in the following description, wherein reference numerals which are identical refer to components which are identical or similar or functionally identical.

DETAILED DESCRIPTION

Figure 1:
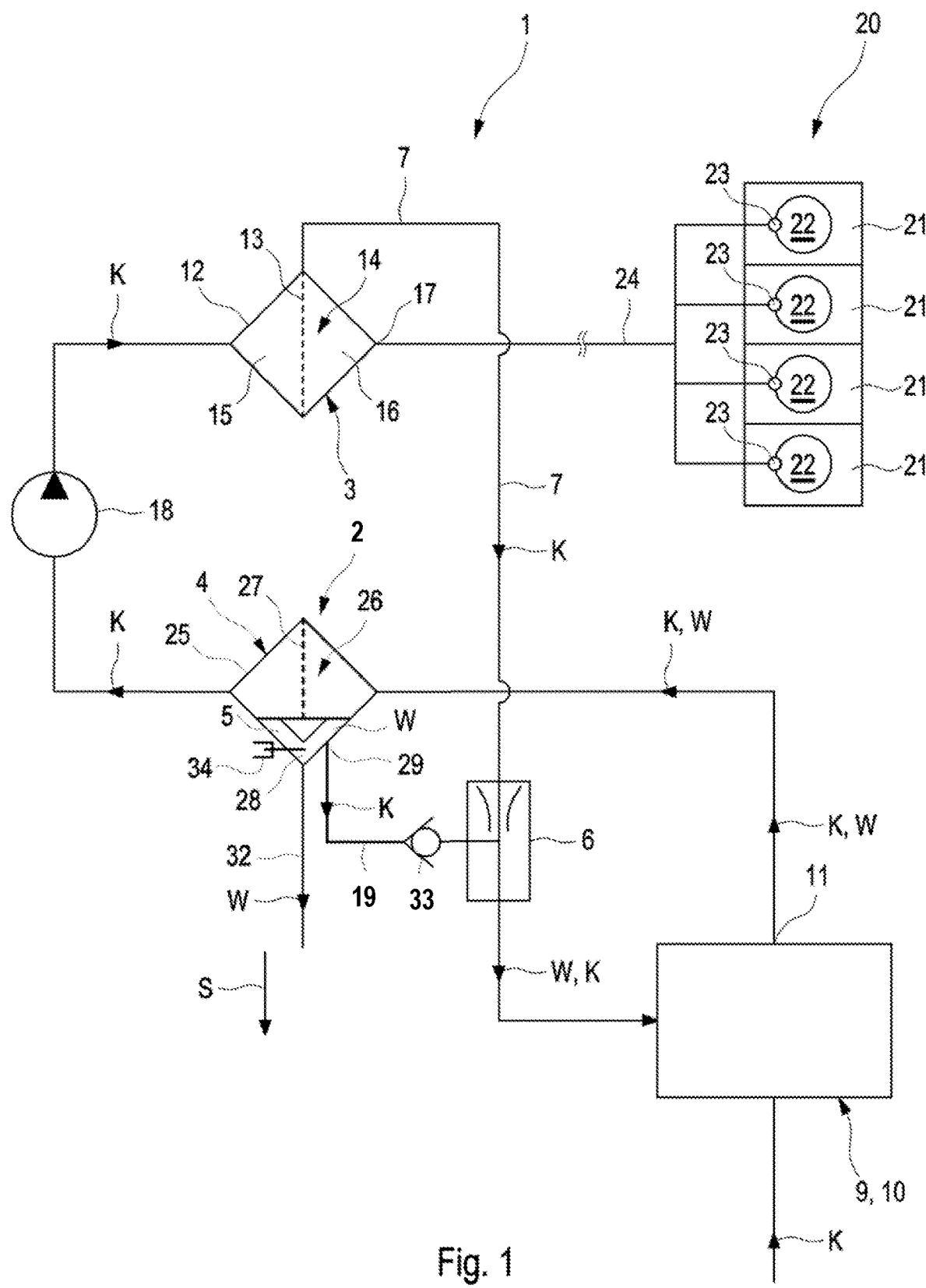
FIG. 1 shows in a highly schematic manner the structure of a fuel filter according to the invention in the manner of a circuit diagram.

In the manner of a circuit diagram, FIG. 1 schematically illustrates the structure of a fuel filter 1 according to the invention for cleaning fuel K for an internal combustion engine. In this instance, FIG. 1 describes a fuel filter having a water discharge means from the water collection chamber and FIG. 2 describes an advantageous development with an additional water separator which serves to separate the fuel which acts as a propellant.

The fuel filter 1 comprises according to FIG. 1 a main filter 3 and a prefilter 2 which is arranged upstream of the main filter 3. There is provided upstream of the prefilter 2 a fuel reservoir 9 which is produced as a fuel tank 10 with the fuel K which is intended to be cleaned. The fuel K can flow successively through the two filters 2, 3. The prefilter 2 comprises a water separator 4 for separating water W present in the fuel K.

The water separator 4 has a separator housing 25 which delimits a housing inner space 26 through which the fuel K can flow. A hydrophobic membrane 27 through which the fuel K can flow to separate the water W present in the fuel K is arranged in the housing inner space 26 of the water separator 4. The water separator 4 also has a water collection chamber 5 for collecting the water W which has been separated in the water separator 4. The prefilter 2 is connected in fluid terms to the main filter 3 by means of a conveying device 18. The conveying device 18 conveys the fuel K from the prefilter 2 into the main filter 3. Furthermore, the fuel filter 1 comprises a suction jet pump 6 which is connected in fluid terms to the water collection chamber 5 of the water separator 4. By means of the suction jet pump 6 which is illustrated in FIG. 1 only in a highly schematic manner, medium is permanently discharged from the water collection chamber 5. Separated water which is present in the water collection chamber 5 below the outlet to the suction jet pump remains in the water collection chamber 5 (cf. FIG. 1). In contrast, fuel K and water W above the outlet are discharged directly therefrom via the suction jet pump 6.

The water collection chamber 5 of the water separator 4 is formed by means of a lower region 28 of the housing inner space 26 with respect to the direction of gravitational force S when the water separator 4 is located in a position for use. In the lower region 28 of the housing inner space 26, there is provided an outlet 29 which communicates in fluid terms with the suction jet pump 6. As a result of the spacing of the outlet 29 with respect to the positionally lower bottom end of the housing inner space 26, the maximum filling level for water in the water collection chamber can be adjusted. In this manner, by means of the suction jet pump 6 the water W above a desired filling level can be pumped out of the water collection chamber 5. A water level sensor 34 which indicates the presence of water W at the outer side, for example, with an electrical signal, may be arranged below the outlet 29 and consequently within the maximum filling level for water W and can indicate the presence of water W at the outer side. On the housing base of the lower region 28 of the water collection chamber 5, a water outlet 32 may be arranged in order to discharge water from the fuel filter 1 into the environment.

As can be seen in FIG. 1, the main filter 3 comprises a fuel outlet 7 which communicates in fluid terms with the suction jet pump 6. In this manner, the fuel which flows through the fuel outlet 7 and which is supplied to the suction jet pump 6 can be used as a propellant for the water W which is intended to be conveyed by the suction jet pump 6 from the water separator 4. The main filter 3 has a filter housing 12 which is illustrated only in a highly schematic manner in FIG. 1 and in which a filter element 13 is preferably arranged so as to be able to be replaced. The filter element 13 subdivides the housing inner space 14 delimited by the filter housing 12 into a dirty side 15 and a clean side 16. In the clean side 16, a fuel outlet 17 for discharging the cleaned fuel K from the fuel filter 1 into an internal combustion engine 20 is present. According to FIG. 2, the suction jet pump 6 is arranged in a connection line 7 which connects the dirty side 15 of the main filter 3 to the additional water separator 8 in fluid terms. The medium from this line drives the suction jet pump 6. Furthermore, the suction jet pump 6 is connected in fluid terms by means of a connection line 19 to the water collection chamber 5 and draws the medium from the water collection chamber 5.

The internal combustion engine 20 which is illustrated only in a highly schematic manner in FIG. 1 has, for example, four cylinders 21 in which an internal combustion chamber 22 is present in each case. Each cylinder 21 has a fuel injector 23 for injecting the cleaned fuel K into the respective combustion chamber 22. The internal combustion engine 20 has a fuel supply 24 for introducing the fuel K into the fuel injectors 23. The fuel filter 1 according to the invention is consequently arranged upstream of the fuel supply 24. The fuel reservoir 9 or the fuel tank 10 has a fuel outlet 11 which communicates via the prefilter 2, the conveying device 18 and the main filter 3 with the internal combustion engine 20.

Figure 2:
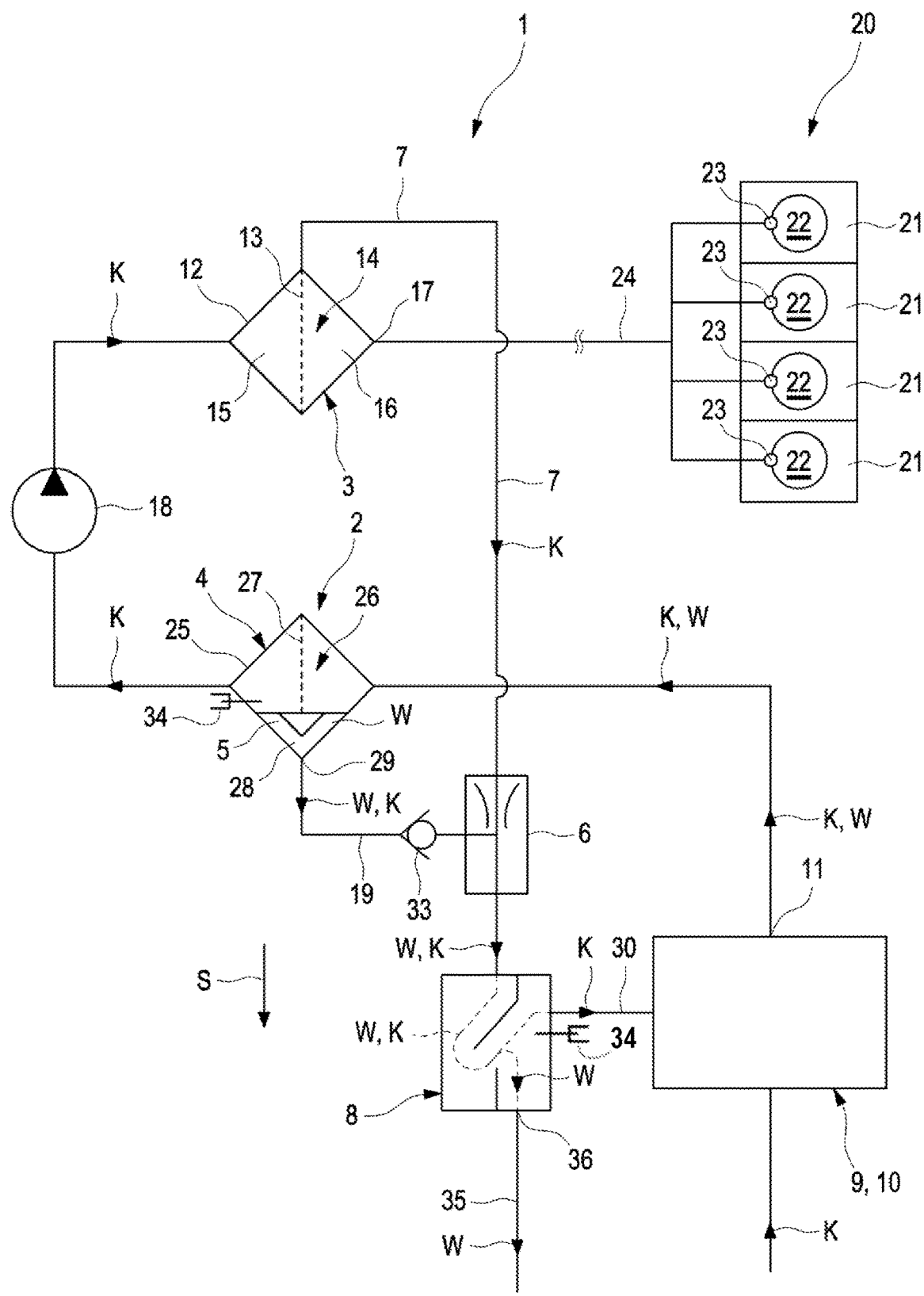
FIG. 2 shows a variant of the fuel filter of FIG. 1 with an additional water separator.

FIG. 2 shows a variant of the example of FIG. 1. According to FIG. 2, the fuel outlet 7 communicates via the suction jet pump 6 in fluid terms with an additional water separator 8 in order to separate the fuel which acts as a propellant from the water W which is conveyed by the suction jet pump from the water separator 4 or the water collection chamber 5 thereof. In the additional water separator 8, there may be arranged a water separator fuel outlet 30 which in order to discharge the fuel present in the water separator 4 communicates in fluid terms with the fuel reservoir 9 or with the fuel tank 10. Furthermore, in the additional water separator 8 a water level sensor 34 for water may be arranged and may indicate the presence of water at the outer side, for example, using an electrical signal. In the lower region 36 of the additional water separator 8, a water outlet 35 may be arranged in order to discharge water W from the filter system into the environment.

According to FIG. 1 and FIG. 2 there is provided in the connection line 19 from the water collection chamber to the suction jet pump 6 a non-return valve 33 which permits flow from the water collection chamber 5 to the suction jet pump 6 and which blocks flow from the suction jet pump 6 to the water collection chamber 5.

The invention claimed is:

1. A fuel filter for cleaning fuel for an internal combustion engine, comprising:
   a main filter and a prefilter arranged upstream of the main filter, through which a fuel is successively flowable;
   the prefilter including a water separator configured to separate water present in the fuel, the water separator including a water collection chamber structured and arranged to collect the separated water;
   the prefilter fluidically connected to the main filter via a conveying device structured and arranged to convey the fuel from the prefilter into the main filter, the conveying device configured to provide an excess pressure build up;
   a suction jet pump fluidically connected to the water collection chamber via which at least one of the fuel and the water is dischargeable from the water collection chamber;
   a water level sensor configured to detect water;
   wherein the water collection chamber includes an overflow outlet connecting the water collection chamber to the suction jet pump;
   wherein the overflow outlet is disposed above a bottom surface of the water collection chamber relative to a direction of gravitational force such that the overflow outlet limits a maximum filling level of the water collection chamber;
   wherein the water collection chamber further includes a water outlet disposed below the overflow outlet relative to the direction of gravitational force, the water outlet connecting the water collection chamber to an external environment; and
   wherein the water level sensor is arranged in the water collection chamber below the overflow outlet relative to the direction of gravitational force.

2. The fuel filter according to claim 1, wherein the main filter includes a fuel outlet fluidically communicating with the suction jet pump, and wherein the fuel flowing through the fuel outlet acts as a propellant of the suction jet pump.

3. The fuel filter according to claim 2, wherein the fuel outlet fluidically communicates, via the suction jet pump, with an additional water separator configured to separate the fuel, which acts as a propellant, from the water, which is conveyed out of the water separator.

4. The fuel filter according to claim 3, further comprising, arranged in the additional water separator, a water separator fuel outlet fluidically communicating with a fuel reservoir via which fuel accumulated in the additional water separator is dischargeable.

5. The fuel filter according to claim 3, wherein the suction jet pump is arranged in a connection line fluidically connecting the main filter to the additional water separator.

6. The fuel filter according to claim 3, wherein the additional water separator includes a second water level sensor configured to detect a level of water retained in the additional water separator.

7. The fuel filter according to claim 2, wherein:
the main filter includes a filter housing in which there is arranged a filter element which subdivides a housing inner space delimited by the filter housing into a dirty side and a clean side;
the fuel outlet of the main filter extends to the suction jet pump from the dirty side via a line;
the line provides ventilation for the filter element in a direction towards a fuel tank; and
a fuel outlet for discharging cleaned fuel into an internal combustion engine is disposed in the clean side.

8. The fuel filter according to claim 2, wherein:
the main filter includes a filter housing in which there is arranged a filter element which subdivides a housing inner space delimited by the filter housing into a dirty side and a clean side;
the fuel outlet of the main filter extends to the suction jet pump from the clean side; and
a fuel outlet for discharging cleaned fuel into an internal combustion engine is disposed in the clean side.

9. The fuel filter according to claim 1, wherein the water separator includes a separator housing delimiting a housing inner space through which the fuel is flowable, and wherein a hydrophobic membrane through which the fuel is flowable to separate the water contained in the fuel is arranged in the housing inner space.

10. The fuel filter according to claim 9, wherein the water collection chamber of the water separator is defined by a lower region of the housing inner space with respect to the direction of gravitational force.

11. The fuel filter according to claim 1, further comprising a connection line between the water collection chamber and the suction jet pump, and a non-return valve arranged in the connection line which permits flow from the water collection chamber to the suction jet pump and prevents flow from the suction jet pump into the water collection chamber.

12. The fuel filter according to claim 1, wherein the overflow outlet is disposed above a lowest water collection point within the water collection chamber relative to the direction of gravitational force.

13. The fuel filter according to claim 12, wherein the separated water is only retainable in the water collection chamber at least one of (i) at and (ii) above the lowest water collection point of the water collection chamber, relative to the direction of gravitational force.

14. An internal combustion engine for a motor vehicle, comprising:
a plurality of cylinders in each of which a respective combustion chamber is disposed;
each cylinder of the plurality of cylinders including at least one fuel injector structured and arranged to inject a fuel into the respective combustion chamber;
at least one fuel supply configured to introduce the fuel into the fuel injectors; and
a fuel filter arranged upstream of the at least one fuel supply, the fuel filter including:
a main filter and a prefilter arranged upstream of the main filter, through which a fuel is successively flowable;
the prefilter including a water separator configured to separate water present in the fuel, the water separator including a water collection chamber structured and arranged to collect the separated water;
the prefilter fluidically connected to the main filter via a conveying device structured and arranged to convey the fuel from the prefilter into the main filter, the conveying device configured to provide an excess pressure build up;
a suction jet pump fluidically connected to the water collection chamber via which at least one of the fuel and the water is dischargeable from the water collection chamber;
wherein the water collection chamber includes an overflow outlet connecting the water collection chamber to the suction jet pump;
wherein the overflow outlet is disposed above a bottom surface of the water collection chamber relative to a direction of gravitational force such that the overflow outlet limits a maximum filling level of the water collection chamber;
wherein a water level sensor configured to detect water is arranged in the water collection chamber below the overflow outlet relative to the direction of gravitational force;
wherein the water collection chamber further includes a water outlet connecting the water collection chamber to an external environment; and
wherein the water outlet is disposed at a lowest water collection point within the water collection chamber.

15. A motor vehicle comprising an internal combustion engine including:
a plurality of cylinders respectively including a combustion chamber and at least one fuel injector structured and arranged to inject a fuel into the combustion chamber;
at least one fuel supply configured to introduce the fuel into the fuel injectors; and
a fuel filter arranged upstream of the at least one fuel supply, the fuel filter including:
a main filter and a prefilter arranged upstream of the main filter, through which a fuel is successively flowable;
the prefilter including a water separator configured to separate water present in the fuel, the water separator including a water collection chamber structured and arranged to collect the separated water;
the prefilter fluidically connected to the main filter via a conveying device structured and arranged to convey the fuel from the prefilter into the main filter, the conveying device configured to provide an excess pressure build up;
a suction jet pump fluidically connected to the water collection chamber via which at least one of the fuel and the water is dischargeable from the water collection chamber;
wherein the water collection chamber further includes a water outlet connecting the water collection chamber to an external environment;

wherein the water collection chamber further includes an overflow outlet connecting the water collection chamber to the suction jet pump;

wherein the overflow outlet is disposed above a bottom of the water collection chamber relative to the direction of gravitational force such that the overflow outlet limits a maximum filling level of the water collection chamber; and wherein a water level sensor configured to detect water is arranged in the water collection chamber below the overflow outlet relative to the direction of gravitational force.

* * * * *